2,963,388

COATING SOLUTION, PROCESS FOR PREPARING THE SOLUTION, AND PROCESS OF COATING AN ELASTIC CELLULAR MATERIAL

Guy Landouar, Saint-Maur, France, assignor to Société Anonyme dite: Anciens Etablissements Desmarquoy, Paris, France, a corporation of France No Drawing. Filed Jan. 20, 1958, Ser. No. 709,748

Claims priority, application France Jan. 30, 1957

10 Claims. (Cl. 117—138.8)

The use of some cellular products, such as the porous polyurethane, presents great advantages in numerous applications where such products are capable of withstanding temperatures which are substantially higher than those supported by plain alveolar rubbers, and of producing a greater elasticity, a rebound without hysteresis, as well as a greater resistance to aging.

However, the field of application of such products is not without limits, particularly when such products are exposed not only to relatively high temperatures but to steam or vapors of hot oil, for instance, in the vicinity of automobile or airplane motors.

It is known that, by molding, it is possible to produce a continuous, nonporous layer on the surface of any cellular product, such layer more easily withstanding the above mentioned agents, but the molding procedures involve very costly outfits and lead to very high costs, when the amortization items are taken into account.

On the other hand, it has been found that, by providing a continuous skin or coating on the surface of a cellular material, such skin being made of a different material, such as of a synthetic rubber of the butadien-nitrile kind with high nitrile content, eventually mixed with polyvinyl chloride, the resulting product possesses improved characteristics, and that such skin so formed on the surface of the cellular material provides a better seal and a stronger resistance to chemical agents the action of which is to be feared.

The known processes for obtaining sufficiently viscous solutions capable of producing a continuous skin, on the surface of cellular materials, which does not, or, at least not substantially, penetrate into said cellular materials, generally involve incorporating solid charges. Such incorporated charges makes it impossible to produce a thin coating, of the order, for instance, of 0.3 millimeter, having a sufficient elasticity and mechanical strength, when taking into account the fact that the cellular product itself is very liable to undergo deformations.

The essential feature of my process for coating cellular products consists in producing such coating by utilizing a solution of materials selected from a group comprising resins and synthetic rubbers into an organic solvent agent (a single organic solvent or a mixture of several organic solvents), such solution being produced at the desired viscosity, while incorporating the required combined water to prevent the penetration of such coating or film into the cells of the support, or, at least, to control such penetration within the limit compatible with the considered applications. Then, as hereinafter explained, such coating is cured or polymerized in situ, after having been spread to the suitable thickness, with a brush or a moulder's spoon, or, preferably with a spray gun, in one or several layers. Such curing or polymerization phase eliminates the combined water and causes the cellular material itself to adhere to the resinous or rubbery film which has eventually entered into the outer layers of said cellular material, so that the adherence caused by the curing or polymerization phase occurs on a relatively large contact surface. A continuous, watertight, elastic and strong coating or skin is thereby obtained, the thickness of which is variable at will and may, for instance, be 0.2 to 2 millimeters, and, furthermore, improves the appearance provided the color is well adapted to the contemplated application. Such skin proves to be perfectly adherent to its base and may follow all deformations thereof without cracking; besides, such skin is water and air tight. By way of example, in the particular embodiment of the invention using polyurethane bases, the coating is produced from materials capable of withstanding a temperature higher than 140° C., oil vapors, liquid projections, and more generally all chemical agents capable of damaging the polyurethane.

Obviously, only such a coating, which does not contain any solid charge and may be applied with the desired thickness and adherence, is capable of positively providing the required tightness and elasticity as well as the desired resistance to temperature rises and to chemical agents. Such aggregate of useful characteristics avoids any cracking whatever when the article, which, for instance, has been cut from a slab of spongious polyurethane, meets service conditions during which such article is exposed to alternating compression and expansion stresses, to gasoline vapors or liquid projections, while another kind of coating having a solid filling could not resist.

Generally speaking, the solution to be utilized according to the invention is prepared from a liquid medium.

According to one preferred form, such solution is prepared from aqueous emulsions having a weight content of dry extract from 40 to 70% of the total weight. To such emulsions is added an organic solvent non miscible with water, such as, for instance, toluene, trichlorethylene, ethyl or amyl acetate or an organic solvent emulsifying with water, such as cyclohexane, for instance. Such solvent emulsifies at the periphery of the solid particles which are partly dissolved by said solvent.

Thereafter, the emulsions thus obtained are coagulated by adding a suitable organic solvent miscible with water, such as, for instance, acetone, an higher alcohol or a phenol. Then, the mixture is worked to form a mass of semi-solid gum containing a small quantity of water and of solvent miscible with water which are distributed into said mass.

The excess liquid is separated by decantation from said semi-solid mass, and, finally, the gum thereby obtained is diluted to the desired viscosity by adding one of the aforesaid solvents or a mixture thereof.

According to another preferred form, such solution is prepared from organic solutions comprising resins or synthetic rubbers dissolved in a suitable solvent or a suitable solvent mixture.

In such case, a solvent or solvent mixture miscible with water is first added in suitable proportions to the solution mentioned above, and, also in suitable proportions, water is added in order to obtain, by stirring, a final solution having the desired viscosity.

In both forms, the water, which is entrapped within the gum or the solution obtained as final product, acts as a swelling agent, and, owing to its water repellent action, prevents a too deep penetration of the coating which may be produced with solutions prepared as outlined above.

The following examples respectively correspond to the above forms for preparing the solutions for coatings according to the invention.

*Example 1*

The initial emulsion is a mixture of aqueous latex with 50% dry extract, namely: in the proportion of 60% by weight of butadiene nitrile with high nitrile content (acrilic, for instance) and 20% of polyvinyl chloride; then is added a mixture of gasoline, trichlorethylene and acetone respectively correspondingly by weight to 40% gasoline, 20% trichlorethylene and 80% acetone in the total weight of aqueous latex. Then follows a stirring to facilitate the production of gum and to eliminate excess liquids by decantation. A diluting solvent is finally added, which comprises 100% by weight of trichlorethylene and 100% by weight of gasoline of the initial total weight of aqueous latex utilized for such emulsion.

*Example 2*

Same as in Example 1, with the exception of a reduction of acetone to 60% by weight of the total weight of latex; afterwards, the respective weights of trichlorethylene and gasoline added for the dilution are reduced from 100% to 75%.

*Example 3*

Same as in Examples 1 and 2, but with the exception of a reduction of acetone to 40% by weight; also the weight of trichlorethylene and gasoline added at the dilution step is reduced to 50% of the total weight of latex instead of 100%.

*Example 4*

The same initial emulsion of latex as in the first three examples is utilized. A mixture of toluene and cyclohexane is firstly added to such emulsion, namely 20% toluene and 40% cyclohexane of the total weight of latex. Then, 40% of this total weight of acetone is added to cause the coagulation of the resins and of the synthetic rubbers. After decantation of the excess liquids, toluene, in the proportion in weight of 120% of the total weight of the latex is added for dilution.

*Example 5*

The initial solution is a solution of resins and synthetic rubbers in toluene, containing, for example, equal weights of toluene and polyethylene chlorosulfonate. Acetone, in the proportion of 35% by weight of the weight of said initial solution is added to the latter, together with water, in the proportion of 15% of said weight of said initial solution, and the whole mixture is stirred. Finally, ethyl acetate, in the proportion of 50% of the weight of said initial solution is added to said initial mixture.

*Example 6*

The same solution of chlorosulfonate as in Example 5 is utilized. The quantities of acetone and water added to said solution are doubled, namely 70% and 30% by weight of the initial weight of said solution instead of 35% and 15%, respectively. Then, 35% of ethyl acetate (instead of 50%) is added and the resulting product is substantially more viscous than in Example 5.

It is worth noting that the aqueous emulsions or the solutions in toluene used in either form above described of my process, for preparing the final solutions applied as protecting coatings to cellular materials, may further contain suitable proportions of plastifiers and/or curing and polymerizing agents.

As a mere general information, it may be said that the characteristics of the coatings obtained from solutions prepared according to Examples 1, 2 and 3 above are the following:

The coating obtained from the solution prepared as in Example 1, relatively fluid when to be applied with the spray gun, is embodied within the cellular material itself constituting the support or base for said coating, such penetration extending over a thickness of the order of a tenth of a millimeter, which permits, by utilizing such coating as an intermediary layer, to increase the surface of contact between such coating and the cellular material itself, in order to increase the resistance to tearing.

If, following said first coating, a second coating made of the solution of the Example 2 is deposited on said first coating, also by using a spray gun, such second coating, which cannot enter into the cells of the base material on account of the barrier provided by said first coating, increases the thickness of the article by approximately one thirtieth of a millimeter.

Finally, if, after a coating has been deposited by means of the solution prepared as in Example 1, a more viscous product, prepared as in Example 3, is applied thereon with a spray gun, in order to make a second coating, the thickness of said second coating is greater than when with the solution described in Example 2, namely of the order of one twentieth of a millimeter instead of one thirtieth of a millimeter, in addition to the first coating.

When the coating is laid by means of a knife, a molder's spoon or a coating machine, it is preferable to utilize the solutions prepared as described in Examples 2 and 3, and the thicknesses thereby obtained are substantially greater.

The examples described above are not given with the intention to thereby limit the scope of my invention.

As explained in the forms of my process corresponding to the Examples 1 to 4, the coagulation procedure may be varied by adding variable proportions of suitable quantities of solvents miscible with water. After decantation of the excess liquids, the solvent or the solvent mixture utilized for the dilution may be added in proportions which may also be varied within wide limits.

Such coagulation may also be caused by heat or by suitable mineral chemical agents, others than the solvents miscible in water, such as aluminium chloride, sodium carbonate, etc., in aqueous solutions or other solutions, provided that the required quantity has been previously added of a solvent or solvent mixture which is miscible in water but not capable of producing the coagulation of the solid components.

In the cases described in the Examples 5 and 6, the concentration of the initial solutions may vary according to the final viscosity desired. The added quantity of water and solvent miscible in water may also vary, but the variation limits are relatively close for a given concentration of the initial solutions.

Finally, the final dilution with one or several solvents can be carried to a greater or smaller extent by varying, within wide limits, the weights of the solvents which are utilized.

All solutions thereby obtained remain within the scope of my present invention, whatever the proportions of the various solvents utilized and of the water incorporated may be.

The process for depositing protective coatings according to my invention include, besides the preparation proper of the aforesaid solutions, the operations consisting in laying such solutions on a base, by any known means, for instance, with a brush, a moulder's spoon or, preferably, with a spray gun, followed by a curing or polymerization step in situ, at room or high temperatures, within the limits of temperature compatible with the characteristics of the base.

What I claim is:

1. A solution of organic materials selected from the group consisting of synthetic rubber, natural rubber, polymerized acrylic monomers, polymerized vinyl monomers and polymerized ethylene monomers, in an organic solvent medium, said solution having a viscosity sufficient to permit it to spread without the addition of solids over the surface of a porous material and to form on said surface a smooth superficial coating free from cracks and swelling, said solution containing 1 to 35% by weight of water in proportion to the organic solvents, said solvents selected frm the group consisting of chlorinated solvents, ketones, esters of lower alcohols, gasoline, toluene and cycyohexane, and the viscosity of said solution would be reduced by at least 20% by the elimination of said water, this reduction in viscosity increasing on an increase in the proportion by weight of water and with a decrease in the proportion by weight of dry material and the weight of the whole solution.

2. A solution according to claim 1, wherein at least one of said synthetic organic materials is a synthetic rubber.

3. A solution according to claim 1, wherein at least one of said synthetic organic materials is a resin.

4. A process for preparing a solution according to claim 1, consisting in preparing a solution from synthetic organic materials selected from a group consisting of resins and synthetic rubbers in an organic solvent miscible with water; adding water in suitable proportion, and eventually adding the necessary quantity of the initial solvent medium to obtain the desired viscosity.

5. A process for depositing a coating on a member made of an elastic cellular material, consisting in depositing a solution according to claim 1, on said cellular material to provide a coating thereon and submitting in situ said coating to a treatment selected from a group consisting of curing and polymerizing treatments.

6. A solution according to claim 1, wherein said organic solvent medium comprises a mixture of organic solvents.

7. A process for preparing a solution according to claim 6, consisting in preparing an aqueous emulsion of at least one synthetic organic material selected from the group consisting of resins and synthetic rubbers, containing a weight of dry extract comprised between 40% and 70% of the total weight of said aqueous emulsion, coagulating the solid components contained in said emulsion by adding thereto a mixture of solvent miscible with water and of solvents non miscible with water; stirring the whole and decanting the excess liquids if necessary, to obtain a gum mass; and diluting said gum mass to the desired viscosity by means of a suitable organic solvent medium.

8. A process for preparing a solution according to claim 6, consisting in preparing an aqueous emulsion of synthetic organic materials selected from a group consisting of resins and synthetic rubbers containing a weight of dry extract comprised between 40% and 70% of the total weight of said aqueous emulsion, adding solvents non miscible with water, in order to obtain an emulsion with solid particles in semi-solution; coagulating the solid components contained in said emulsions by adding organic solvents miscible with water; stirring the whole; decanting the excess liquids; and diluting the gum mass thus obtained to the desired viscosity by means of a suitable organic solvent medium.

9. A process for preparing a solution according to claim 6, consisting in preparing a solution from synthetic organic materials selected from a group consisting of resins and synthetic rubbers in a solvent non miscible with water; adding, in suitable proportions, a mixture of water with a number of solvents compatible with said mixture, one of said solvents at least, being miscible in water to permit incorporating the latter in said solution; and adding said mixture in suitable proportion to give the desired final viscosity to said solution.

10. A process for depositing a coating on a member of an elastic cellular material, consisting in depositing a solution according to claim 6 on said cellular material to provide a coating thereon and submitting in situ said coating to a treatment selected from a group consisting of curing and polymerizing treatments.

References Cited in the file of this patent

UNITED STATES PATENTS

| | | |
|---|---|---|
| 2,519,660 | James | Aug. 22, 1950 |
| 2,652,384 | Sayko et al. | Sept. 15, 1953 |
| 2,673,845 | Stevens | Mar. 30, 1954 |

OTHER REFERENCES

Du Pont: "Application of Hypalon Coatings to Cellular Products," Dec. 10, 1957.